(12) United States Patent
Nobusawa

(10) Patent No.: US 8,181,829 B2
(45) Date of Patent: May 22, 2012

(54) HIGH VISCOSITY OIL SUCTION AND DISPENSING TOOL

(75) Inventor: Hiroshi Nobusawa, Tokyo (JP)

(73) Assignee: Sanken Co., Ltd., Tokyo (JP)

( * ) Notice: Subject to any disclaimer, the term of this patent is extended or adjusted under 35 U.S.C. 154(b) by 587 days.

(21) Appl. No.: 12/491,702

(22) Filed: Jun. 25, 2009

(65) Prior Publication Data

US 2010/0327024 A1 Dec. 30, 2010

(51) Int. Cl.
*A47G 19/00* (2006.01)

(52) U.S. Cl. ........ 222/323; 222/327; 222/391; 222/466; 141/27; 184/1.5; 184/105.2; 417/374; 74/125.5; 74/141.5; 74/144; 74/157; 74/490.15

(58) Field of Classification Search ............ 141/27, 141/357; 417/315, 374; 184/1.5, 105.1–105.2; 222/82, 323–327, 289, 424, 391; 74/111–112, 74/125.5, 141.5, 144, 146, 156–159, 479.01, 74/490.12–490.15

See application file for complete search history.

(56) References Cited

U.S. PATENT DOCUMENTS

| | | | | | |
|---|---|---|---|---|---|
| 1,365,892 | A | * | 1/1921 | Craver | 74/111 |
| 2,227,397 | A | * | 12/1940 | Lucker | 254/106 |
| 2,450,596 | A | * | 10/1948 | Kais | 254/111 |
| 2,768,768 | A | * | 10/1956 | Cornell et al. | 222/80 |
| 2,792,154 | A | * | 5/1957 | L'Heureux | 222/259 |
| 3,736,612 | A | * | 6/1973 | Check et al. | 12/142 P |
| 5,022,563 | A | * | 6/1991 | Marchitto et al. | 222/327 |
| 5,445,505 | A | * | 8/1995 | Hung | 417/374 |
| 6,460,481 | B1 | * | 10/2002 | Young | 118/14 |
| 7,168,595 | B2 | * | 1/2007 | Ling | 222/263 |
| 2010/0327024 | A1 | * | 12/2010 | Nobusawa | 222/391 |

* cited by examiner

*Primary Examiner* — Kevin P Shaver
*Assistant Examiner* — Andrew Bainbridge
(74) *Attorney, Agent, or Firm* — Young & Thompson

(57) ABSTRACT

A suction and dispensing tool (1) comprises: a cylinder (10) storing the fluid; a nozzle (20); a piston moving forward and backward in the cylinder (10); a piston rod (40) for driving the piston; and two ratchet type driving mechanisms (60) for driving the piston rod (40) forward and backward. The driving mechanism (60) comprises: a frame (50) having a handle (52), mounted to the cylinder (10), and two triggers (80) rotatably attached to the frame (50) at the front and rear sides of the handle (52). By rotating each of the triggers (80) to the handle (52), the piston rod (40) can be moved forward or backward. The rotating operation of the trigger (80) requires power smaller than an operation for directly pushing and drawing the piston rod by hand. Accordingly, it becomes possible to refill and dispense a high viscosity oil easily.

10 Claims, 10 Drawing Sheets

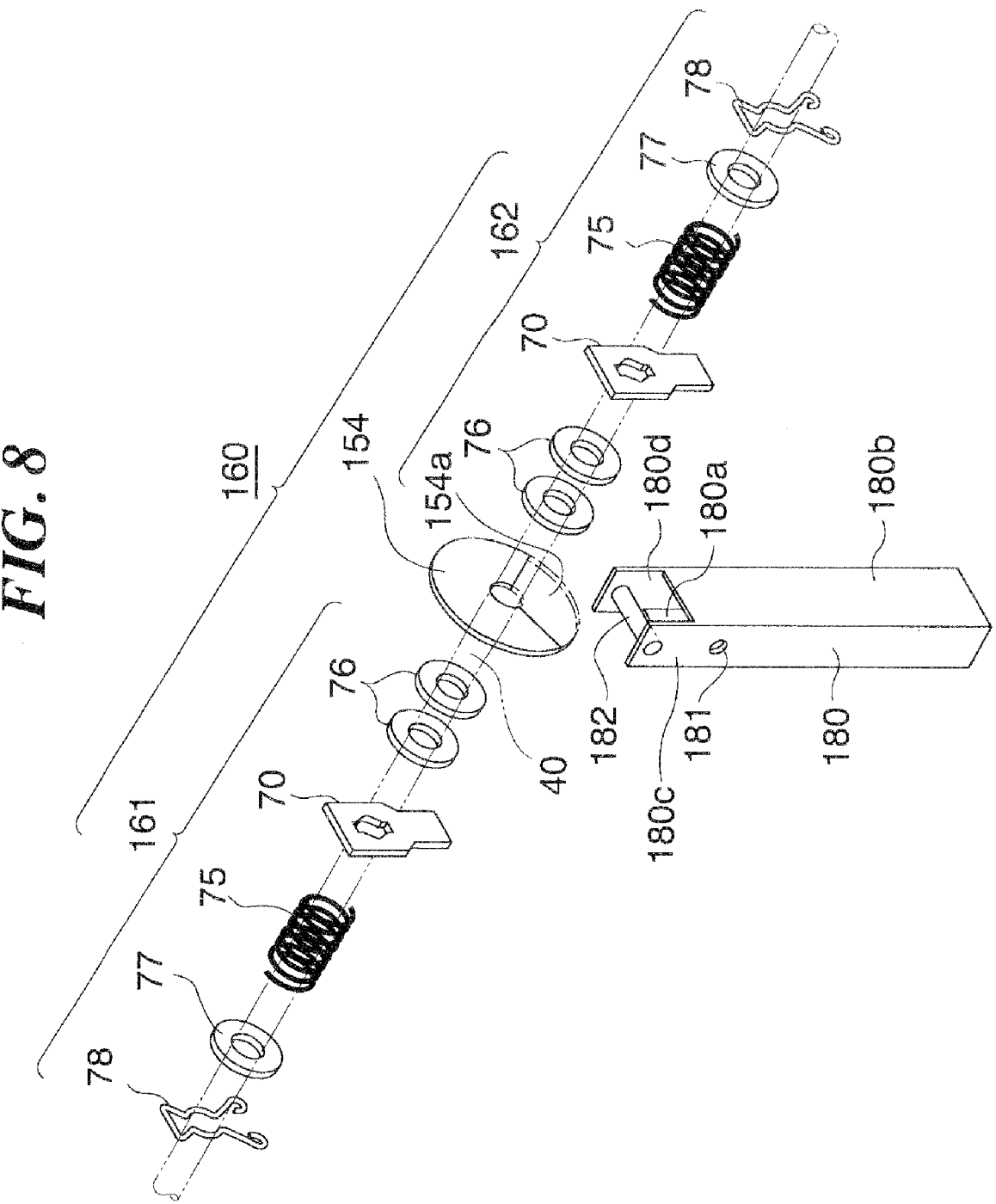

HIGH VISCOSITY OIL SUCTION AND DISPENSING TOOL

TECHNICAL FIELD

The present invention relates to a tool capable of sucking a fluid for refilling through a nozzle and dispensing the fluid through the nozzle. More particularly, it relates to a tool capable of easy sucking and dispensing of a high viscosity oil such as a lubricant with relatively low power.

BACKGROUND ART

An oil gun and a caulk gun are known as a toll for s dispensing a viscosity fluid. The oil gun is used for changing a differential oil or transmission oil upon a maintenance of automobiles. Standard type oil gun has a cylinder and a piston rod. The oil gun of the type requires a strong power for pushing and drawing the piston rod in order to dispense and suck a high viscosity oil.

Caulk guns are used for coating and injecting a sealing material on construction sites. A caulk gun, described in U.S. Pat. No. 2,768,768, has a cylinder and a piston rod provided with a reversible ratchet mechanism. The ratchet mechanism is for switching the moving direction of the piston rod in the forward direction or the backward direction. This mechanism is also provided with teeth formed on the piston rod and pawls activated by a lever. When the ratchet mechanism is switched such that the piston rod dose not move in one direction and then the lever is activated, the piston rod is allowed to be moved in the other direction. However, the purpose of the caulk gun, described in the patent, is for eliminating occurrence of afterflow following gun operation (shown in C.1, Lines 59 to 60.) Furthermore, the caulk gun needs a process to slide a sleeve in order to switch the moving direction of the piston rod.

DISCLOSURE OF THE INVENTION

Problems to be Resolved by the Invention

An object of the present invention is to provide a suction and dispensing tool capable of easy sucking and dispensing of a high viscosity oil with relatively low power.

Means of Solving the Problems

A suction and dispensing tool according to the first aspect of the present invention is for sucking and dispensing a fluid such as a high viscosity oil from/to a gear box and the like and comprises:
  a cylinder storing the fluid;
  a nozzle attached to a front end of said cylinder;
  a piston moving forward and backward in said cylinder;
  a piston rod for driving said piston, the rod extending in a length direction of said cylinder and projecting through a rear end of said cylinder opposite to said nozzle; and
  two ratchet type driving mechanisms for selectively feeding said piston rod forward or backward,
  wherein said driving mechanism comprises:
  a frame having a handle, the frame mounted to said cylinder and guiding said piston rod in a slidable manner; and
  two triggers rotatably attached to said frame relatively at a front side or a rear side of said handle, and to be rotated toward said handle so as to move said piston rod forward or backward.

According to the present invention, by rotating each of the triggers to the handle, the piston rod is moved forward and backward so as to dispense and suck a fluid from and into the cylinder, respectively. Since the rotating operation of the trigger requires power smaller than an operation for directly pushing and drawing the piston rod by hand, an easy sucking and dispensing a fluid having a high viscosity is realized.

A suction and dispensing tool according to the second aspect of the present invention is for sucking and dispensing a fluid such as a high viscosity oil from/to a gear box and the like and comprises:
  a cylinder storing the fluid;
  a nozzle attached to a front end of said cylinder;
  a piston moving forward and backward in said cylinder;
  a piston rod for driving said piston, the rod extending in the length direction of said cylinder and projecting through a rear end of said cylinder opposite to said nozzle; and
  two ratchet type driving mechanisms for selectively feeding said piston rod forward or backward,
  wherein said driving mechanism comprises:
  a frame having two handles, the frame mounted to said cylinder and guiding said piston rod in a slidable manner; and
  a trigger rotatably attached to said frame at the center of said handles, and to be rotated toward each of said handles so as to move said piston rod forward or backward.

In this case also, easy sucking and dispensing of a high viscosity oil with relatively low power becomes possible.

In the present invention, said nozzle may be formed with an on-off valve.

By closing the on-off valve, accidental sucking and dispensing of the fluid from the nozzle can be prevented. And, by adjusting the aperture of the nozzle, a dispensing speed (sucking speed) of the fluid can be adjusted.

In the present invention, a measuring cup for the fluid may be detachably attached to said cylinder or nozzle.

The measuring cup allows a predetermined amount of fluid such as a lubricant to be refilled. Alternatively, when an additive is added to the fluid, a predetermined amount of additive may be added from the measuring cup to the fluid.

In the first aspect of the present invention, said ratchet type driving mechanism may further comprise:
  two ratchet assemblies attached to said frame at the front and rear sides of said handle,
  each of said ratchet assembly comprising:
  a trigger to be rotated toward and away from said handle;
  a ratchet plate, through which said piston rod is passed, relatively engaging with said piston rod by rotating said trigger; and
  a spring biasing said ratchet plate to said handle,
  wherein by rotating said trigger to said handle said ratchet plate engages with said piston rod and then moves said ratchet plate forward or backward while keeping the engagement with said piston rod, resulting in the forward and backward movement of said piston rod.

In the second aspect of the present invention, said ratchet type driving mechanism may further comprise:
  a trigger rotatably arranged at the center of said handles and to be rotated toward and away from each of said handle; and
  two ratchet assemblies attached to said frame at the front and rear sides of said trigger,
  each of said ratchet assembly comprising:
  a ratchet plate, through which said piston rod is passed, selectively engaging with said piston rod by rotating said trigger; and
  a spring biasing said ratchet plate to said trigger,
  wherein by rotating of said trigger said ratchet plate engages with said piston rod and then moves said ratchet plate forward or backward while keeping the engagement with said piston rod, resulting in the forward and backward movement of said piston rod.

In these cases, the force of the engagement is sufficiently Large between the ratchet plate and the piston rod such that the movement of the ratchet plate causes the movement of the piston rod. Since the operation for rotating the trigger requires relatively small power, easy sucking and dispensing of the fluid becomes possible even if the fluid to be sucked and dispensed has a high viscosity.

Effect of the Invention

According to the present invention, by rotating one trigger to either one of two handles, or by rotating either one of two triggers to one handle, the piston rod can be moved forward or backward respectively. The operation for rotating the trigger requires power smaller than an operation for directly pushing and drawing the piston rod by hand. Accordingly, it becomes possible to suck and dispense a high viscosity oil easily.

BRIEF DESCRIPTION OF THE DRAWINGS

FIG. 4 are views showing a structure of a ratchet plate.

FIG. 8 is an exploded perspective view showing a structure of the ratchet mechanism of the suction and dispensing tool of FIG. 7;

PREFERRED EMBODIMENT OF THE INVENTION

Hereinafter, preferred embodiments of the present invention will be described with reference to the accompanying drawings.

Figure 1:
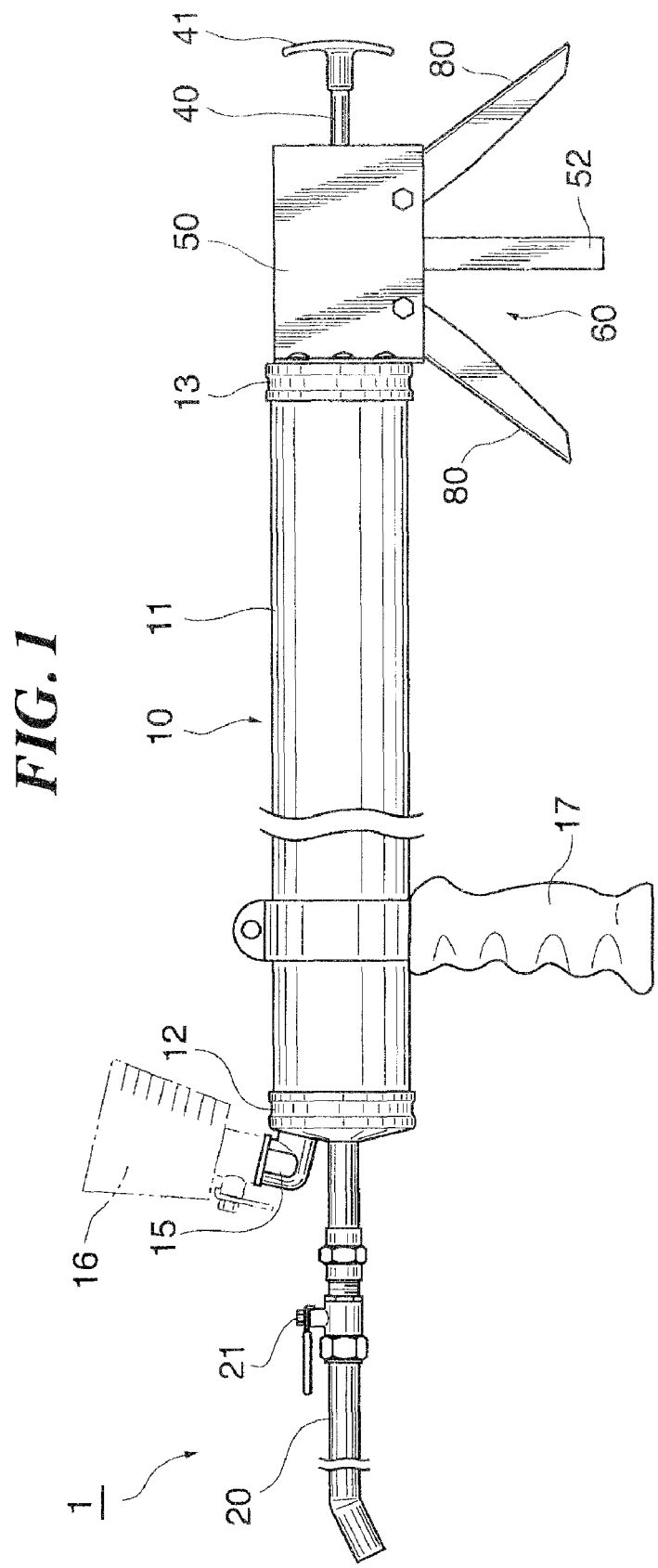
FIG. 1 is a side view showing a whole structure of a suction and dispensing tool according to the first embodiment of the present invention.
Figure 2:
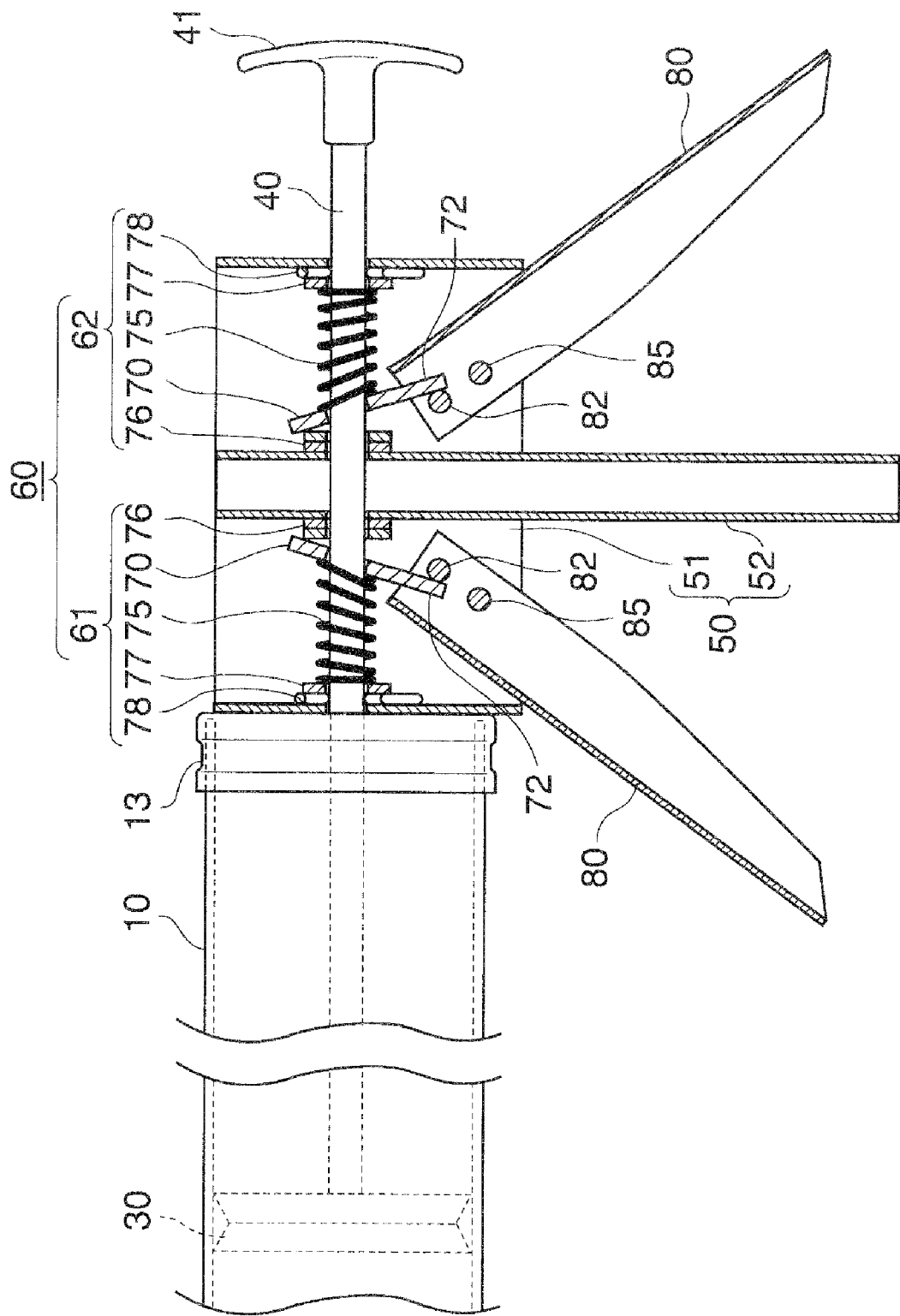
FIG. 2 is a partially sectional side view showing a structure of a ratchet mechanism of the suction and dispensing tool of FIG. 1.

Referring to FIGS. 1 and 2, a whole structure of a suction and dispensing tool according to the first embodiment of the present invention will be described.

The suction and dispensing tool 1 comprises a cylinder 10 for storing a fluid to be sucked and dispensed; a nozzle 20 mounted at a distal end of the cylinder 10; a piston 30 (shown in FIG. 2) moving forward and backward in the length direction in the cylinder 10; and a piston rod 40 for driving the piston 30. The cylinder 10 is connected to a frame 50 having a handle, at the rear end. The frame 50 having a handle houses a ratchet type driving mechanism 60 for selectively feeding the piston rod 40 forward or backward.

The cylinder 10 has a cylindrical body 11 and front and rear caps 12 and 13 closing front and rear openings of the body 11. The nozzle 20 is attached to the center of the front cap 12 and projects in the same direction as the cylinder 10. The distal end of the nozzle 20 is slightly angled. At the middle portion of the nozzle 20, an on-off valve 21 is attached, which opens and closes an inner bore of the nozzle 20. By operating the on-off valve 21 to close the inner bore, accidental sucking and dispensing of the fluid can be prevented. And, by operating the valve 21 to adjust the aperture of the inner bore of the nozzle 20, a dispensing speed (sucking speed) of the fluid can be adjusted.

The front cap 12 is further provided with an attachment opening 15 to which a measuring cup is attached with an on-off valve. The measuring cup allows refilling of a predetermined amount of fluid such as a lubricant. Alternatively, when an additive is added to the fluid, a predetermined amount of additive may be added from the measuring cup to the fluid. The attachment opening 15 may be formed on the nozzle 20.

A grip 17 is attached to the front portion of the cylinder 10 for easy handling.

The piston 30 is made from elastic material such as rubber and, as shown in FIG. 2, the circumferential surface of the piston 30 contacts the inner surface of the cylinder 10 tightly. The piston 30 is fixed to the front end of the piston rod 40. The piston rod 40 extends in the length direction of the cylinder 10, and penetrates through the rear cap 13 and also the frame 50 having a handle. The rear cap 13 is formed with an air release hole (not shown) communicating the bore through which the piston rod 40 penetrates. The piston rod 40 has a handle 41 at the rear end.

Figure 3:
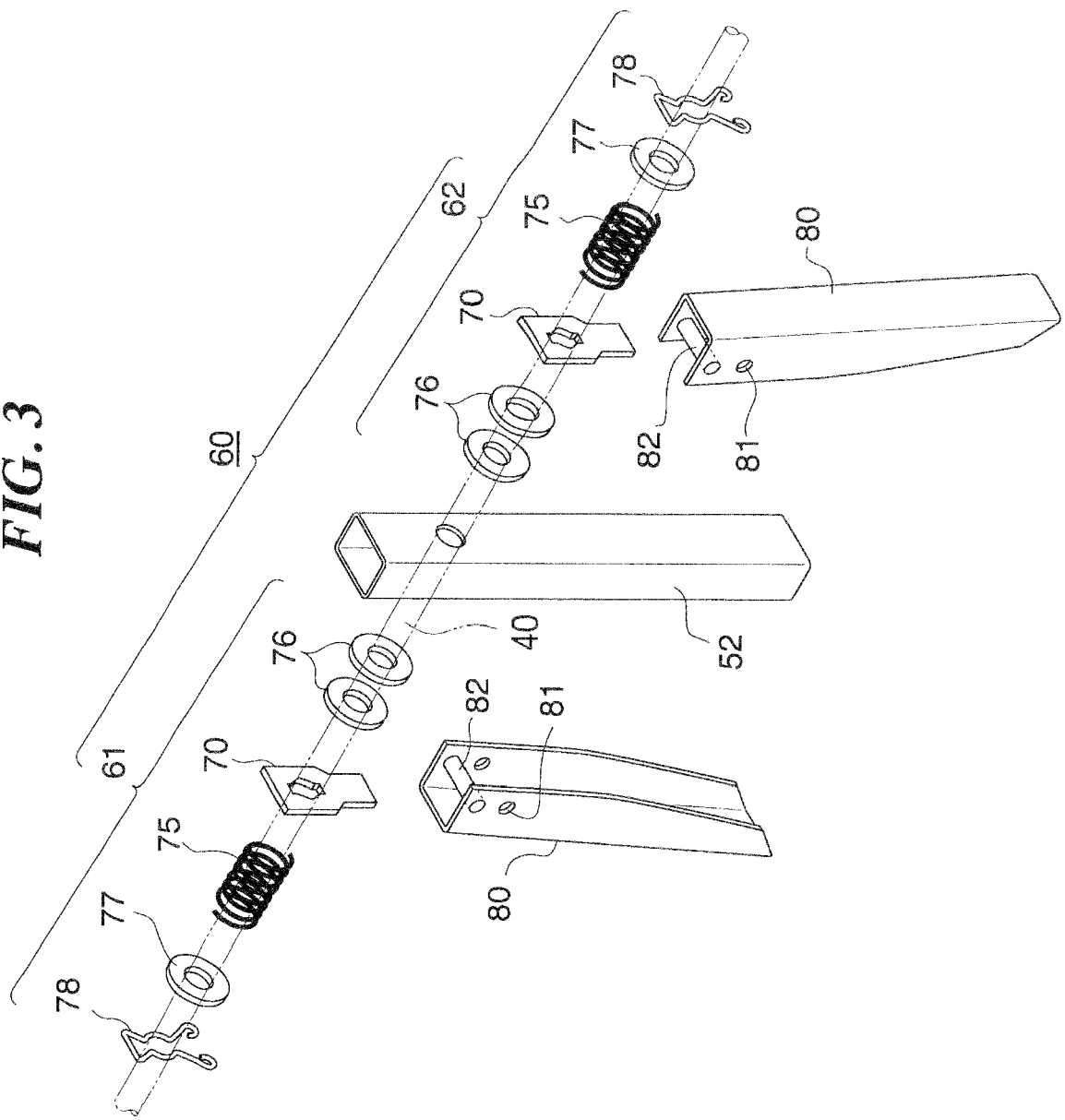
FIG. 3 is an exploded perspective view showing a structure of the ratchet mechanism of the suction and dispensing tool of FIG. 1.

Referring to FIGS. 2 and 3, the ratchet type driving mechanism 60 will be described.

The frame 50 having a handle is fixed to the rear cap 13 of the cylinder 10. As shown in FIG. 2, the frame 50 having a handle comprises a hollow rectangular-solid shaped casing 51 and a handle 52 fixed to the center of the casing 51 in the length direction. The handle 52 projects straightly downward from the casing 51. The handle 52 divides the inner space of the casing 51 into a front space and a rear space. The piston rod 40 penetrates the casing 51 and the handle 52 in a slidable manner.

In the front and rear inner spaces of the casing 51, a move-forward ratchet assembly 61 and a move-backward ratchet assembly 62 are stored respectively. The ratchet assemblies 61 and 62 have the same structure mainly comprising a ratchet plate 70 through which the piston rod 40 is passed; a spring 75 which surrounds the piston rod 40 and biases the ratchet plate 70; and a trigger 80 which operates the ratchet plate 70.

Figure 4A:
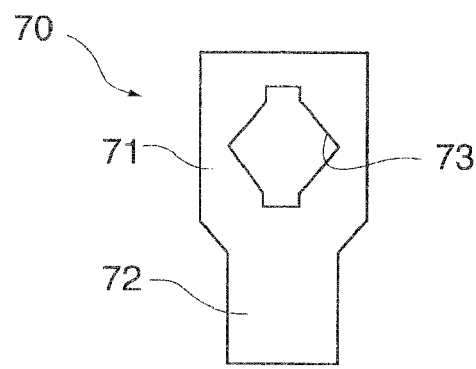
FIG. 4A is a plane view.

Referring to FIG. 4, the ratchet plate 70 will be described.

The ratchet plate 70 is a plate-shaped member of some thickness, and has an upper body portion 71 of a rectangular planer shape and a lower actuating portion 72 having a width shorter than the body portion 71. The body portion 71 is formed with an aperture 73 at the center, through which the piston rod 40 penetrates. In this embodiment, the aperture 73 has a shape of a virtually long rhomboid.

Figure 4B:
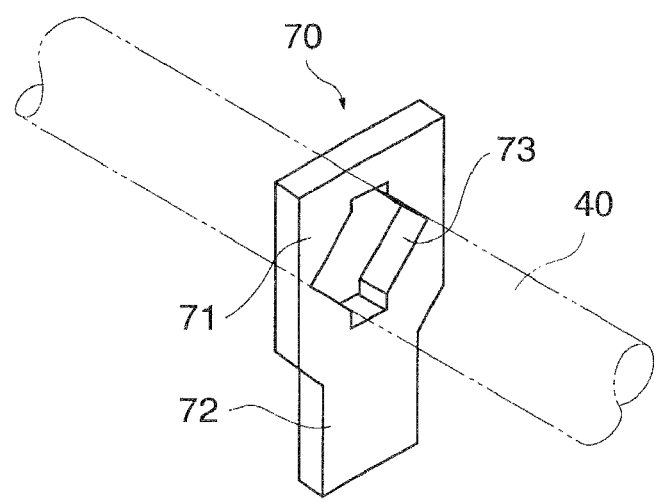
FIG. 4B is a perspective view showing a state in which a piston rod is passed through the ratchet plate.
Figure 4C:
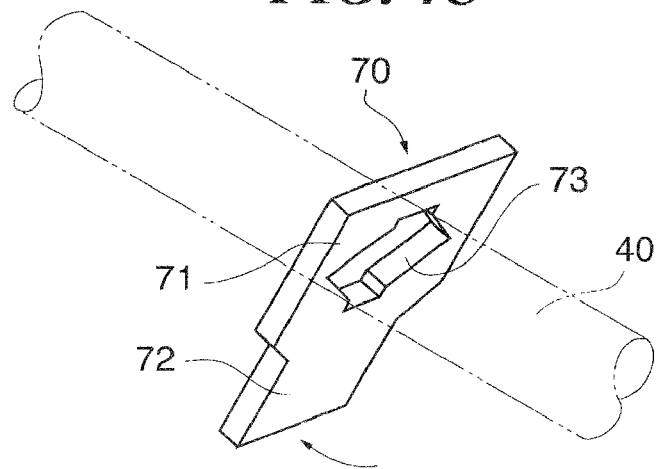
FIG. 4C is a perspective view showing a state in which the ratchet plate is engaged with the piston rod.

As shown in FIG. 4B, under a state in which the ratchet plate 70, through which the piston rod 40 penetrates, is held perpendicular to the piston rod 40, the ratchet plate 70 is able to slide along the piston rod 40 freely. However, as shown in FIG. 4C, on pressing the actuating portion 72 of the ratchet plate 70 and tilting the ratchet plate 70 relative to the piston rod 40, corners (edges) between the inner surface of the aperture 73 and the front and rear surfaces of the ratchet plate 70 are pressed against the outer surface of the piston rod 40 tightly, resulting in that the ratchet plate 70 is engaged with the piston rod 40 thereby to grip it fixedly.

Referring to FIG. 3, the trigger 80 will be described.

The trigger 80 is a substantially linear member of a U-shaped cross section having a back plate and left and right side plates standing from the left and right side edges of the back plate. The both side plates are formed with holes 81 penetrating in the direction perpendicular to the piston rod 40 at a slightly lower position from the upper edge. And, between the side plates above the holes 81, a bar 82 is fixed.

The move-forward assembly 61 will be described.

As shown in FIG. 2, the ratchet plate 70 is biased by the spring 75 backward and pressed against the front surface of the handle 52. Between the rear surface of the ratchet plate 70 and the front surface of the handle 52, two washers 76 are positioned. And, between the front end of the spring 75 and the front wall of the casing 51, a washer 77 and a wire ring 78 are positioned.

The trigger 80 is rotatably attached to the casing 51 at the substantially center portion of the front space in the length direction by a pin 85 supported by the holes 81 of the trigger 80 while directing the opened side backward. The upper portion above the pin 85 is housed in the casing 51 and the lower portion under the pin 85 protrudes downward from the casing 51.

The ratchet plate 70 is assembled to the trigger 80 such that the activation portion 72 of the ratchet plate 70 is inserted into a space between the bar 82 and the back plate of the trigger 80 and the rear surface of the activating portion 72 comes contact with the bar 82. Since the rotating point (pin 85) of the trigger 80 is positioned in front of the ratchet plate 70, the trigger 80 rotates around the pin 85 clockwise in the figure and tilts in the obliquely forward and downward direction. And, since the activating portion 72 of the ratchet plate 70 is pushed forward by the bar 82, the ratchet plate 70 tilts relative to the piston rod 40.

The move-backward assembly 61 will be described.

As shown in FIG. 2, the ratchet plate 70 is biased by the spring 75 forward and pressed against the rear surface of the handle 52. Between the front surface of the ratchet plate 70 and the rear surface of the handle 52, two washers 76 are positioned. And, between the rear end of the spring 75 and the rear wall of the casing 51, a washer 77 and a wire ring 78 are positioned.

The trigger 80 is rotatably attached to the casing 51 at the substantially center portion of the rear space in the length direction by a pin 85 passing the holes 81 of the trigger 80 while directing the opened side forward. The upper portion above the pin 85 is housed in the casing 51 and the lower portion under the pin 85 protrudes downward from the casing 51.

The ratchet plate 70 is assembled to the trigger 80 such that the activation portion 72 of the ratchet plate 70 is inserted into a space between the bar 82 and the back plate of the trigger 80 and the front surface of the activating portion 72 comes contact with the bar 82. Since the rotating point (pin 85) of the trigger 80 is positioned in rear of the ratchet plate 70, the trigger 80 rotates around the pin 85 counterclockwise in the figure and tilts in the obliquely backward and downward direction. And, since the activation portion 72 of the ratchet plate 70 is pushed backward by the bar 82, the ratchet plate 70 tilts relative to the piston rod 40.

In the state shown in FIG. 2, although each of the ratchet plates 70 tilts and is engaged with the piston rod 40 slackly, the force of the engagement is not large so much, allowing the pushing and drawing of the piston rod 40 by hand.

Referring to FIG. 5, the move-forward operation of the piston rod 40 will be described.

Figure 5A:
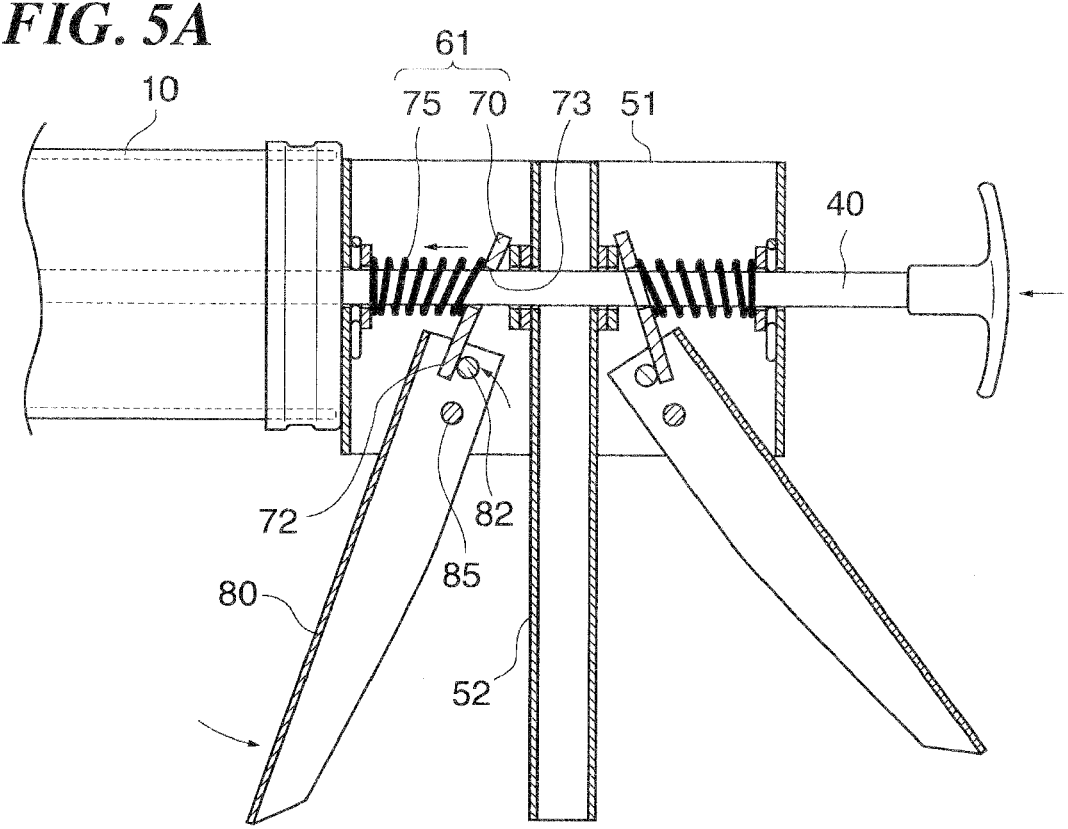
FIG. 5 are views showing an operation of the ratchet mechanism of the suction and dispensing tool of FIG. 2 at a dispensing.

As shown in FIG. 5A, the lower portion of the trigger 80, protruding downward from the casing 51, is pulled toward the handle 52. Practically, for example, a user supports the grip 17 (shown in FIG. 1), mounted to the cylinder 10, with his left hand and the handle 52 with the thumb of his right hand, and then the user squeezes the trigger 80 toward the handle 52 with fingers of his right hand, other than the thumb. The squeezing rotates the trigger 80 around the pin 85 counterclockwise in the figure, causing the bar 82 of the trigger 80 to move in the left-hand direction of the figure. The movement of the bar 82 pushes the activating portion 72 of the ratchet plate 70 in the left-hand direction of the figure. And, the tilt of the ratchet plate 70 becomes large and then the corners between the inner surface of the aperture 73 of the ratchet plate 70 and the front and rear surfaces of the ratchet plate 70 are engaged with the outer surface of the piston rod 40 tightly and therefore the ratchet plate 70 grips the piston rod 40. On squeezing the trigger 80 to move the pin 82 in the left-hand direction further, the ratchet plate 70 is moved in the left-hand direction against the force of the spring 75 while keeping the engagement with the piston rod 40. As the result, the piston rod 40 with which the ratchet plate 70 is engaged moves in the left-hand direction (advances.)

Figure 5B:
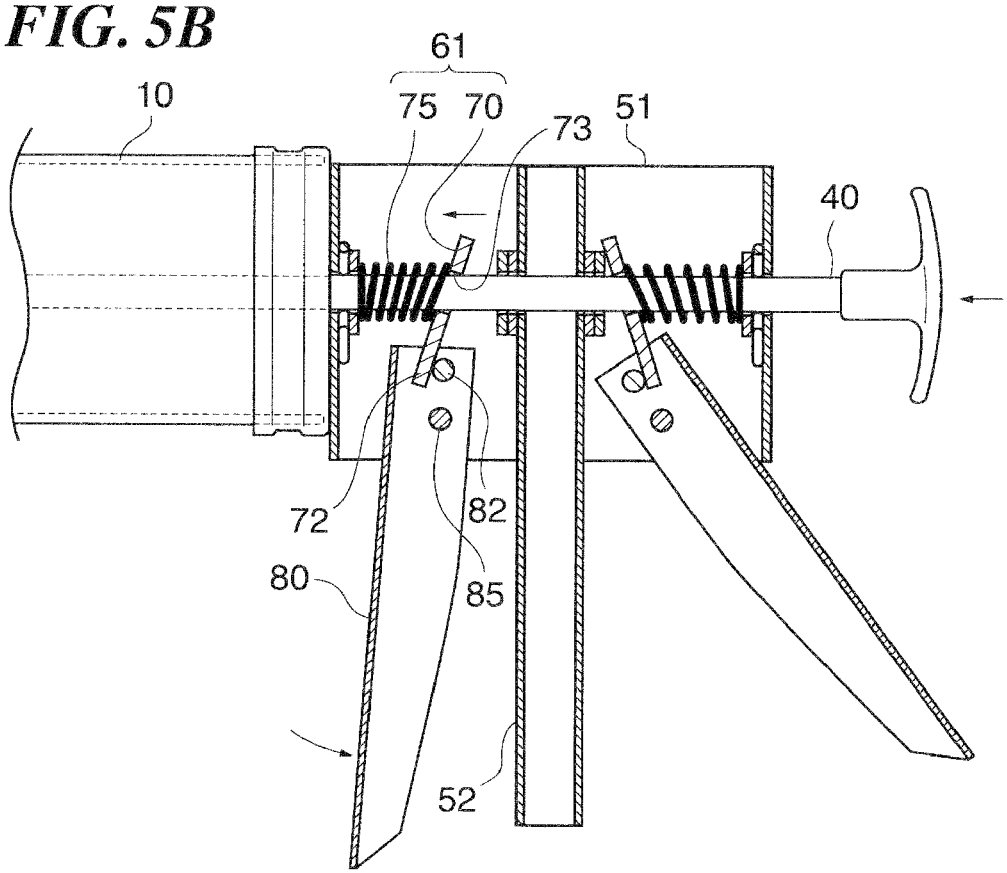

On squeezing the trigger 80 to move the pin 82 in the left-hand direction further, as shown in FIG. 5B, the spring 75 is compressed and the ratchet plate 70 is unable to be moved. And, the ratchet plate 70 gradually comes to take a posture relatively perpendicular to the piston rod 40, causing less force of the engagement of the ratchet plate 70 with the piston rod 40.

When the trigger 80 is released, the ratchet plate 70 is biased by the spring 75 backward into the initial state (shown in FIG. 2.) Accompanied with the movement of the ratchet plate 70, the bar 82 of the trigger 80 is pushed by the activating portion 72 of the ratchet plate 70 into the initial state (shown in FIG. 2.) During the movement, the piston rod 40 is kept at the advanced position due to the resistance of the fluid in the cylinder 10. By repeating the squeezing of the trigger 80, the piston rod 40 advances gradually thereby to dispense the fluid from the cylinder 10 through the nozzle 20.

Referring to FIG. 6, the move-backward operation of the piston rod 40 will be described.

Figure 6A:
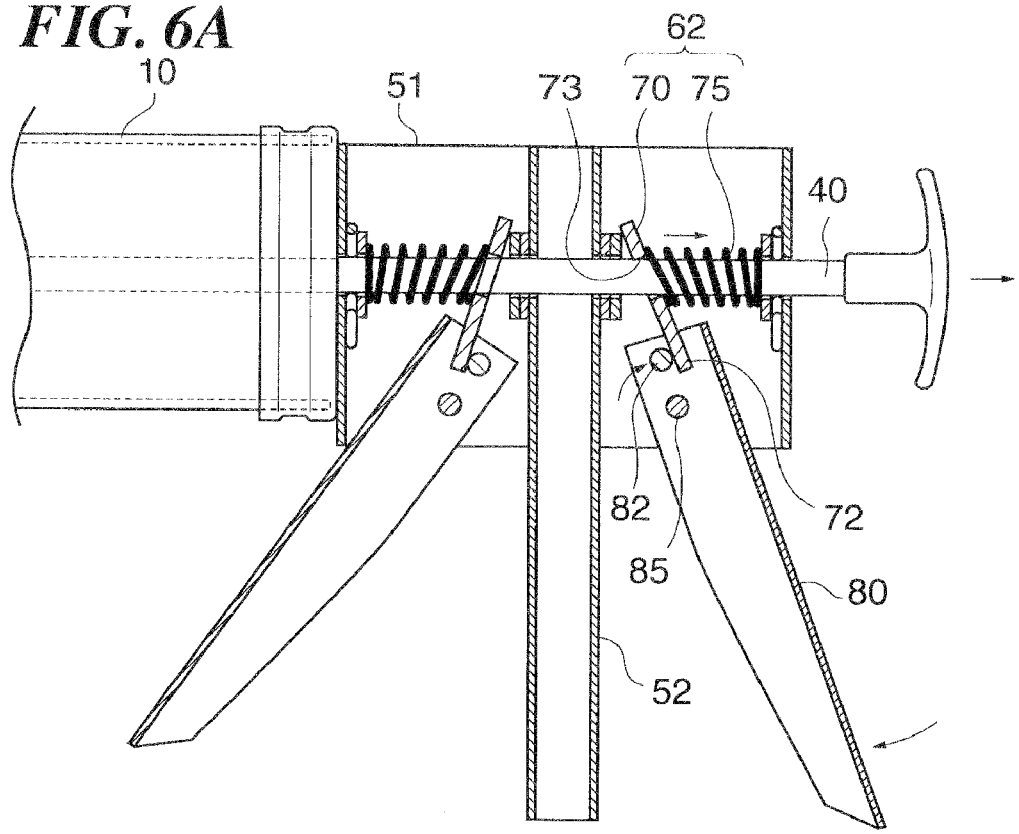
FIG. 6 are views showing an operation of the ratchet mechanism of the suction and dispensing tool of FIG. 2 at a sucking.

As shown in FIG. 6A, the lower portion of the trigger 80, protruding downward from the casing 61, is squeeze toward the handle 52. Practically, for example, a user supports the grip 17 (shown in FIG. 1), mounted to the cylinder 10, with his left hand and the handle 52 with the fingers other than the thumb of his right hand, and then the user pushes the trigger 80 toward the handle 52 with the thumb of his right hand. The squeezing rotates the trigger 80 around the pin 85 clockwise in the figure, causing the bar 82 of the trigger 80 to move in the right-hand direction of the figure. The movement of the bar 82 pushes the activating portion 72 of the ratchet plate 70 in the right-hand direction of the figure. And, the tilt of the ratchet plate 70 becomes large and then the corners between the inner surface of the aperture 73 of the ratchet plate 70 and the front and rear surfaces of the ratchet plate 70 are engaged with the outer surface of the piston rod 40 tightly, and therefore the ratchet plate 70 grips the piston rod 40. On squeezing the trigger 80 to move the pin 82 in the right-hand direction further, the ratchet plate 70 is moved in the right-hand direction against the force of the spring 75 while keeping the engagement with the piston rod 40. As the result, the piston rod 40 with which the ratchet plate 70 is engaged moves in the right-hand direction (is retracted.)

Figure 6B:
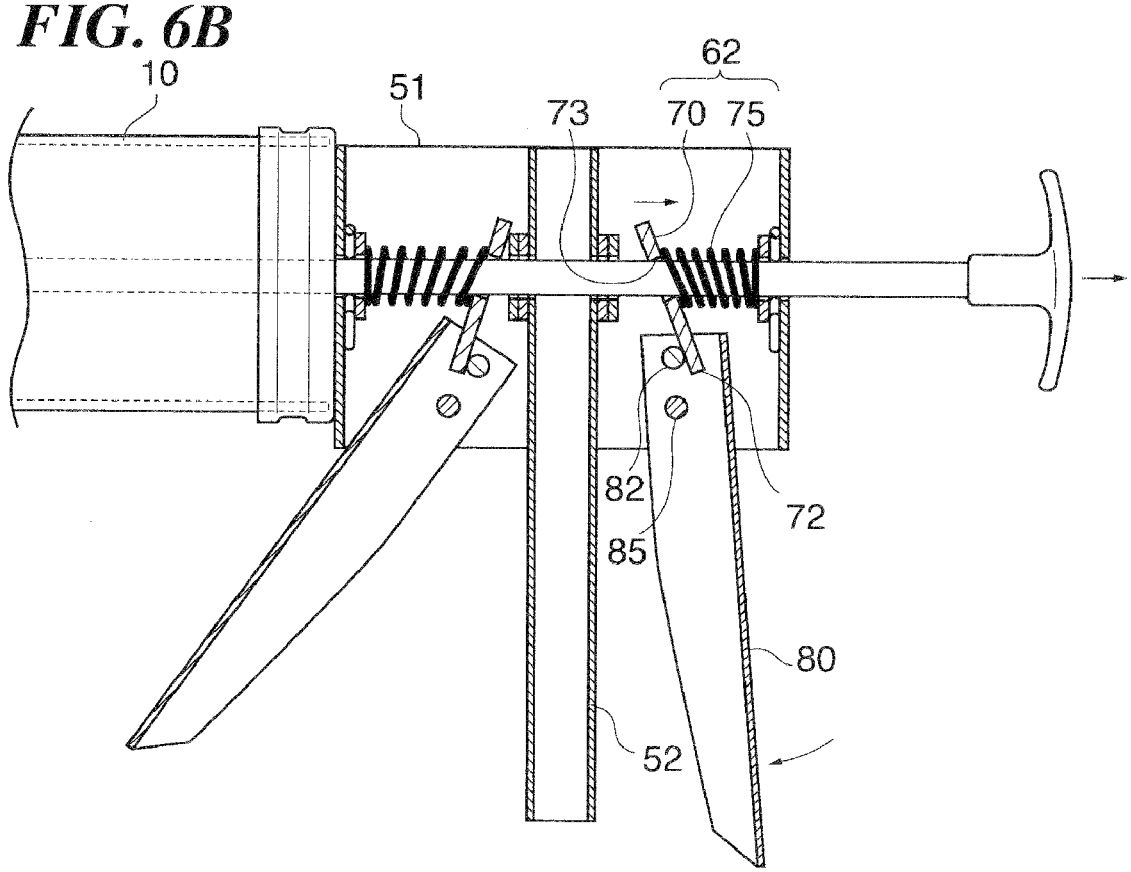

On squeezing the trigger 80 to move the pin 82 in the right-hand direction further, as shown in FIG. 6B, the spring 75 is compressed and the ratchet plate 70 is unable to be moved. And, the ratchet plate 70 gradually comes to take a posture relatively perpendicular to the piston rod 40, causing less force of the engagement of the ratchet plate 70 with the piston rod 40.

When the trigger 80 is released, the ratchet plate 70 is biased forward by the spring 75 into the initial state (shown in FIG. 2.) Accompanied with the movement of the ratchet plate 70, the bar 82 of the trigger 80 is pushed by the activating portion 72 of the ratchet plate 70 into the initial state (shown in FIG. 2.) During the movement, the piston rod 40 is kept at the retracted position due to the resistance of the fluid in the cylinder 10. By repeating the squeezing of the trigger 80, the piston rod 40 is retracted thereby to suck the fluid into the cylinder 10 through the nozzle 20.

As described above, by repeating the operation for squeezing the front trigger 80, the piston rod 40 advances so as to dispense the fluid. And, by repeating the operation for squeezing the rear trigger 80, the piston rod 40 is retracted so as to suck the fluid. In these cases, the force of the engagement of the ratchet plate 70 with the piston rod 40 is sufficiently large such that the movement of the ratchet plate 70 causes the movement of the piton rod 40. Since the squeezing operation of the trigger 80 for moving the ratchet plate 70 requires relatively small power, easy sucking and dispensing of the fluid becomes possible even if the fluid to be sucked and dispensed has a high viscosity.

Additionally, as described above, closing the on-off valve 21 of the nozzle 20 can prevent accidental dispense and suction of the fluid. Also, by operating the on-off valve 21 to adjust an aperture of the inner bore of the nozzle 20, a dispense speed and suction speed can be adjusted. When a measuring cup is attached to the attachment opening 15 of the cylinder 10, a predetermined amount of fluid can be refilled. Also, an additive may be added.

If the piston rod 40 is marked with a scale, a refilling amount and a dispensing amount can be known. In this case, for example, a moving distance of the piston rod 40 when any trigger 80 is squeezed one-time is preliminarily measured. And, by using the measured distance and a section area of the cylinder 10, a volume of a space made by the movement of the piston rod 40 at the one squeezing of the trigger 80 is obtained. Based of the volume, the scale is marked on the piston rod 40.

Figure 7:
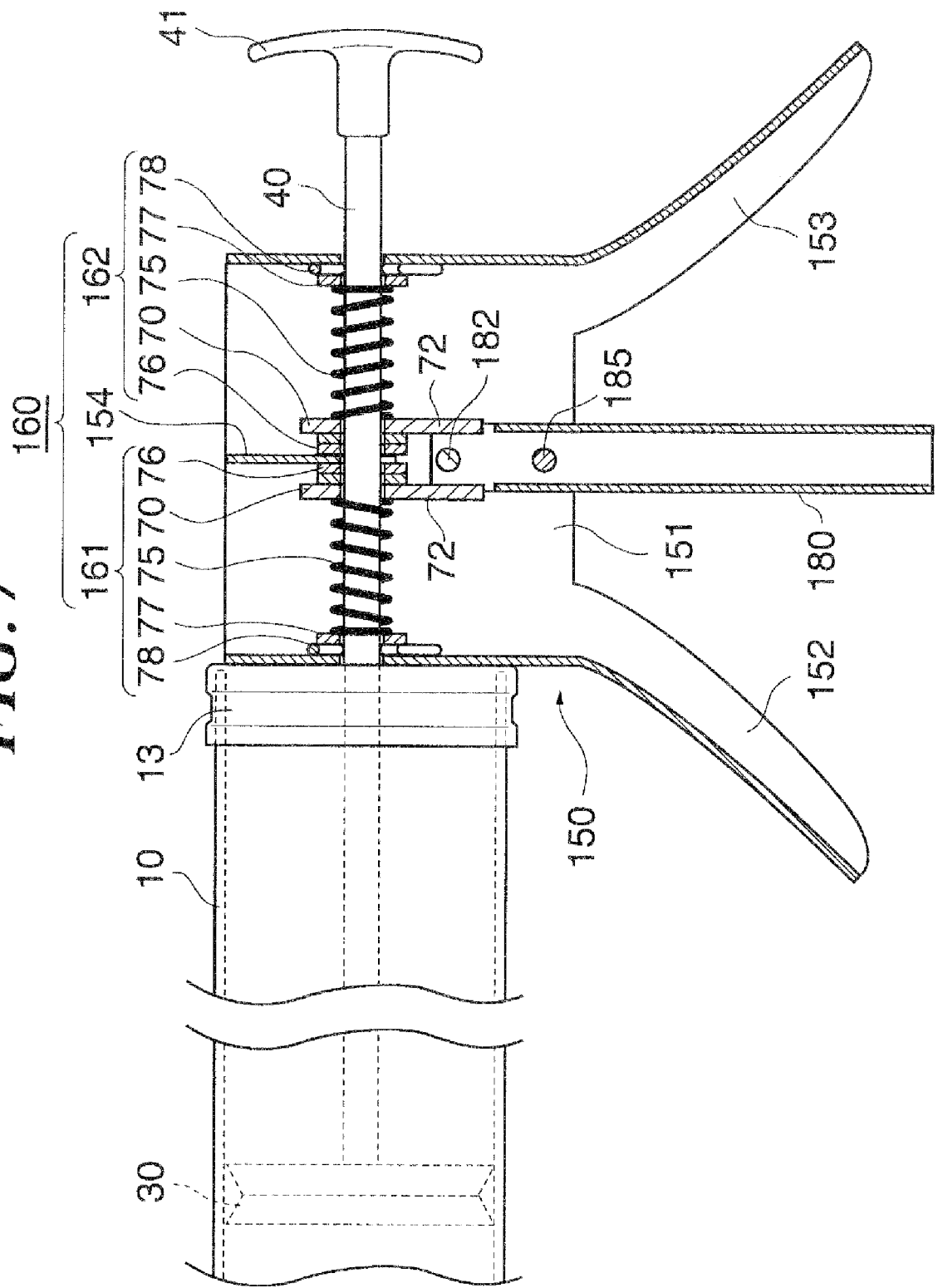
FIG. 7 is a partially sectional side view showing a structure of a ratchet mechanism of the suction and dispensing tool according to the second embodiment of the invention.

Referring to FIGS. 7 and 8, a suction and dispensing tool according to the second embodiment of the present invention will be described.

The suction and dispensing tool of this embodiment has the same structure as the suction and dispensing tool of FIG. 1 except for structures of a frame having two handles and one trigger. The members and parts having the same structure and function as the tool of FIG. 1 are marked with the same reference numeral as FIG. 1 and the like, and are not described in detail.

In this embodiment, the frame 150 having handles is fixed to the rear cap 13 of the cylinder 10, as with the first embodiment. As shown in FIG. 7, the frame 150 having a handle comprises a hollow rectangular solid-shaped casing 151 and handles 152 and 153 integrally fixed to the front and rear portions of the casing 151. The front handle 152 protrudes from the casing 151 in the obliquely forward and downward direction and the rear handle 153 protrudes from the casing 151 in the obliquely backward and downward direction. At the center of the inside of the casing 151 in the length direction, a partition wall 154 is attached. The partition wall 154 has a disk shape from which a fan shape part 154a is cut out, as shown in FIG. 8. The partition wall 154 divides the inner space of the casing 151 into front and rear spaces.

In the front and rear spaces of the casing 151, a move-forward ratchet assembly 161 and a move-backward ratchet assemble 162 are housed respectively. The ratchet assemblies 161 and 162 have the same structure mainly comprising a ratchet plate 70 through which the piston rod 40 is passed; and a spring 75 which surrounds the piston rod 40 and biases the ratchet plate 70. In this embodiment, both of the ratchet plates 70 are operated by one trigger 180. The ratchet plate 70 and the spring 75 are the same as the suction and dispensing tool of FIG. 1.

The trigger 180 is, as shown in FIG. 8, a substantially linear hollow member having front and back plates 180a and 180b and left and right side plates 108c and 180d. The both side plates 180c and 180d protrude upward from the upper edges of the front and back plates 180a and 180b. The side plates are formed with holes 181 penetrating in the direction perpendicular to the piston rod 40 at a slightly lower position from the upper edges. And, above the holes 181, a bar 182 is fixed between the side plates. As shown in FIG. 7, the trigger 180 is rotatably attached to the casing 151 below the partition wall 151 by a pin 185 passing the holes 181. The upper portion above the pin 185 is stored in the casing 151 and the lower portion under the pin 185 protrudes downward from the casing 151. When the trigger 180 is rotated, since the upper portion of the trigger 180 passes the cut-out space of the partition wall 154, the partition wall 154 does not prevent the rotating of the trigger 180.

In the move-forward assembly 161, the ratchet plate 70 is biased by the spring 75 and pressed against the front surface of the partition wall 154. Between the rear surface of the ratchet plate 70 and the front surface of the partition wall 154, two washers 76 are positioned. And, between the front end of the spring 75 and the front wall of the casing 151, a washer 77 and a wire ring 78 are positioned.

In the move-backward assembly 162, the ratchet plate 70 is biased by the spring 75 and pressed against the rear surface of the partition wall 154. Between the front surface of the ratchet plate 70 and the rear surface of the partition wall 154, two washers 76 are positioned. And, between the rear end of the spring 75 and the rear wall of the casing 151, a washer 77 and a wire ring 78 are positioned.

The bar 182 of the trigger 180 is positioned between the activation portions 72 of the ratchet plates 70.

Under a state shown in FIG. 7, each of the ratchet plates 70 is positioned perpendicularly to the piston rod 70 and is not engaged with the piston rod 70, allowing the pushing and drawing of the piston rod 40 by hand.

Referring to FIG. 9, the move-forward operation of the piston rod 40 will be described.

Figure 9A:
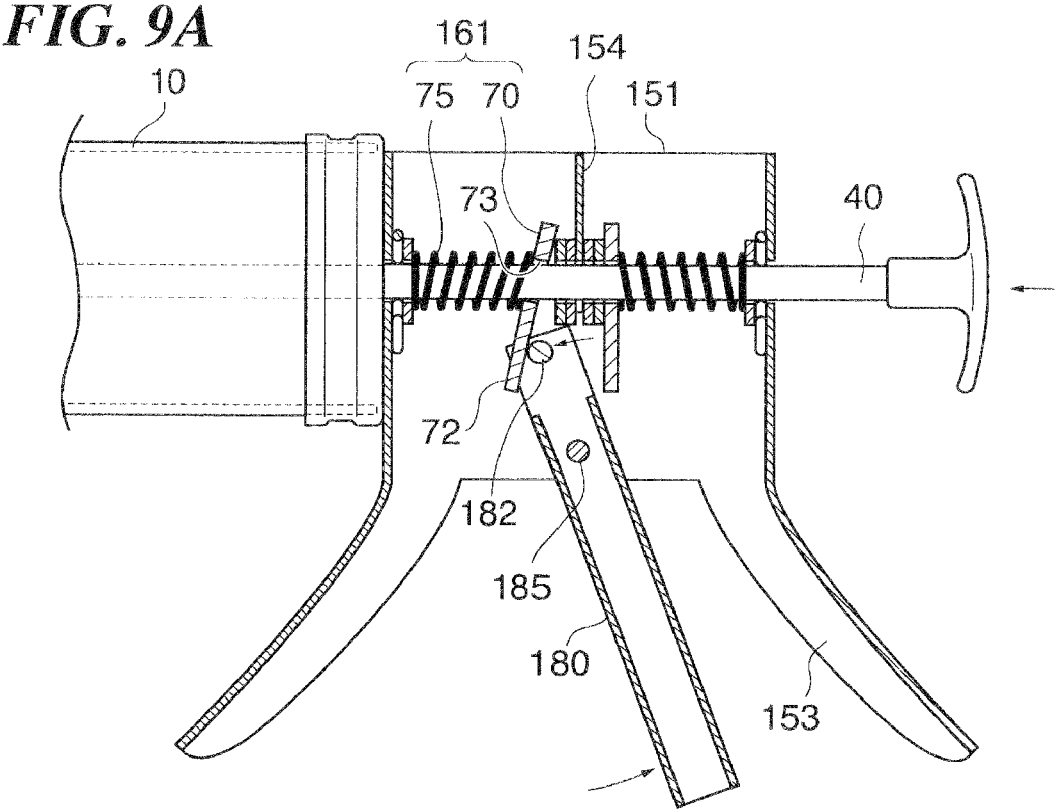
FIG. 9 are views showing an operation of the ratchet mechanism of the suction and dispensing tool of FIG. 7 at a dispensing.

As shown in FIG. 9A, the lower portion of the trigger 180, protruding downward from the casing 151, is squeezed toward the rear handle 153. Practically, for example, a user supports the grip 17 (shown in FIG. 1), mounted to the cylinder 10, with his left hand and the rear handle 153 with the thumb of his right hand, and then the user pulls the trigger 180 toward the rear handle 153 with fingers of his right hand, other than the thumb. The squeezing rotates the trigger 180 around the pin 185 counterclockwise in the figure, causing the bar 182 of the trigger 180 to move in the left-hand direction of the figure. The movement of the bar 182 pushes the activating portion 72 of the ratchet plate 70 in the left-hand direction of the figure and tilts the ratchet plate 70. On squeezing the trigger 180 to move the bar 183 in the left-hand direction further, the tilt of the ratchet plate 70 becomes large and then the corners between the inner surface of the aperture 73 of the ratchet plate 70 and the front and rear surfaces of the ratchet plate 70 are engaged with the outer surface of the piston rod 40 tightly. Therefore, the ratchet plate 70 grips the piston rod 40. On squeezing the trigger 180 to move the pin 182 in the left-hand direction furthermore, the ratchet plate 70 is moved in the left-hand direction against the force of the spring 75 while keeping the engagement with the piston rod 40. As the result, the piston rod 40 with which the ratchet plate 70 is engaged is moved in the left-hand direction (advances.)

Figure 9B:
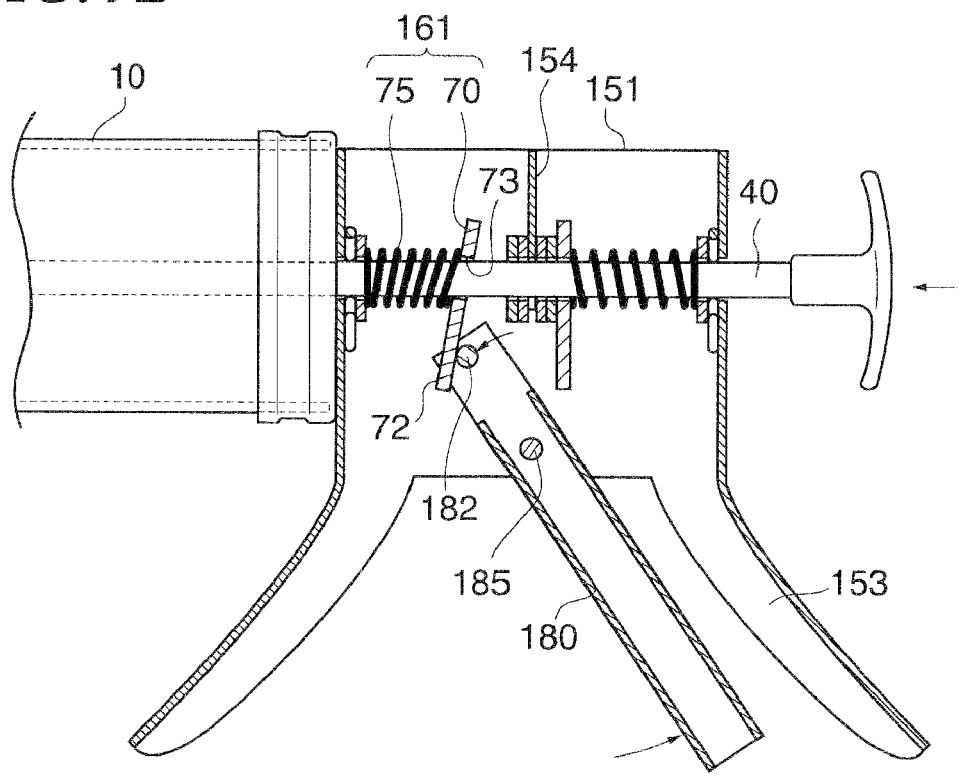

On squeezing the trigger 180 to move the pin 182 in the left-hand direction further, as shown in FIG. 9B, the spring 75 is compressed and the ratchet plate 70 is unable to be moved.

When the trigger 180 is released, the ratchet plate 70 is biased by the spring 75 backward into the initial state (shown in FIG. 7.) Accompanied with the movement of the ratchet plate 70, the bar 182 of the trigger 180 is pushed by the activating portion 72 of the ratchet plate 70 into the initial state. During the movement, the piston rod 40 is kept at the advanced position due to the resistance of the fluid in the cylinder 10. By repeating the squeezing of the trigger 180, the piston rod 40 advances thereby to dispense the fluid from the cylinder 10 through the nozzle 20.

Referring to FIG. 10, the move-forward operation of the piston rod 40 will be described.

Figure 10A:
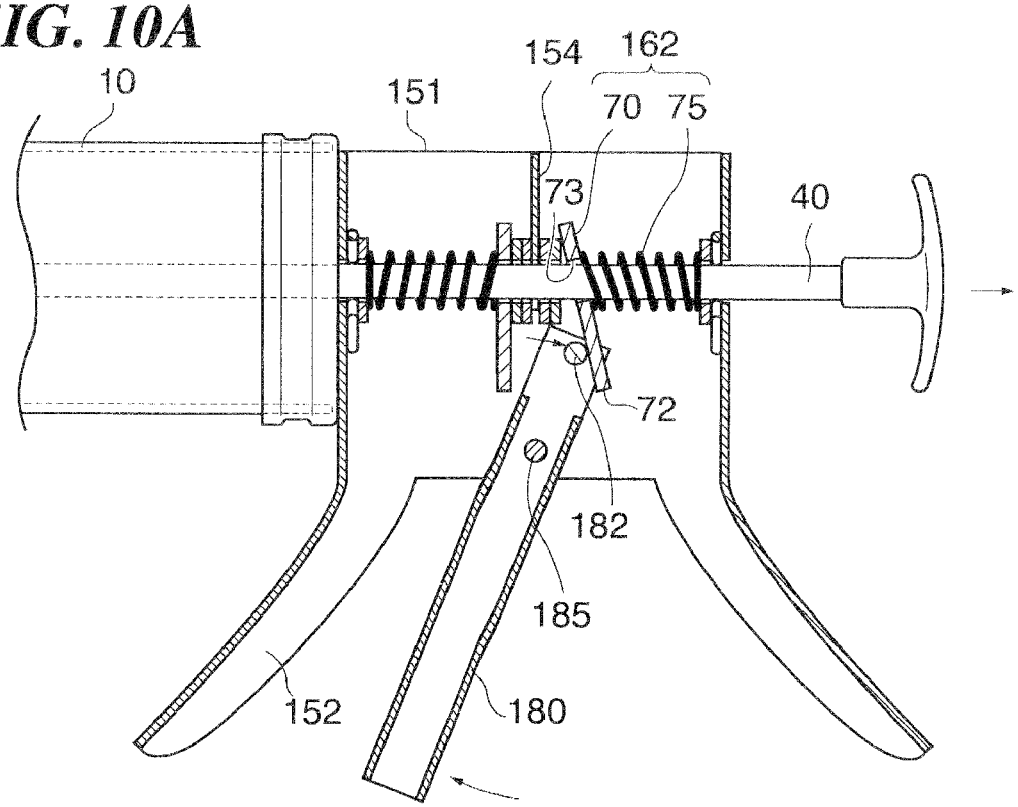
FIG. 10 are views showing an operation of the ratchet mechanism of the suction and dispensing tool of FIG. 7 at a sucking.

As shown in FIG. 10A, the lower portion of the trigger 180, protruding downward from the casing 151, is squeezed toward the front handle 152. Practically, for example, a user supports the grip 17 (shown in FIG. 1), mounted to the cylinder 10, with his left hand and the front handle 152 with the fingers other than the thumb of his right hand, and then the user pushes the trigger 180 toward the front handle 152 with the thumb of his right hand. The pushing rotates the trigger 180 around the pin 185 clockwise in the figure, causing the bar 182 of the trigger 180 to move in the right-hand direction of the figure. The movement of the bar 182 pushes the activating portion 72 of the ratchet plate 70 in the right-hand direction of the figure and tilts the ratchet plate 70. On squeezing the trigger 180 to move the pin 182 in the right-hand direction further, the tilt of the ratchet plate 70 becomes large and then the corners between the inner surface of the aperture 73 of the ratchet plate 70 and the front and rear surfaces of the ratchet plate 70 are engaged with the outer surface of the piston rod 40 tightly. Therefore, the ratchet plate 70 grips the piston rod 40. On squeezing the trigger 180 to move the pin 182 in the right-hand direction further, the ratchet plate 70 is moved in the right-hand direction against the force of the spring 75 while keeping the engagement with the piston rod 40. As the result, the piston rod 40 with which the ratchet plate 70 is engaged is moved in the right-hand direction (is retracted.)

Figure 10B:
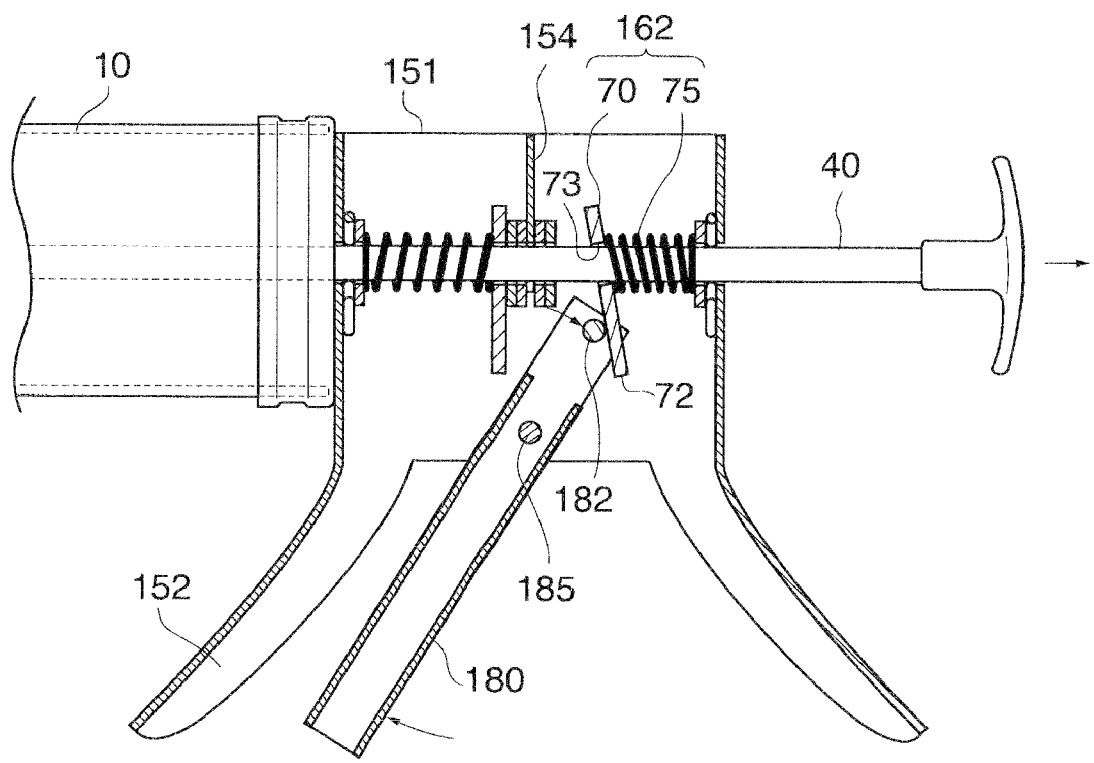

On squeezing the trigger 180 to move the pin 182 in the right-hand direction further, as shown in FIG. 10B, the spring 75 is compressed and the ratchet plate 70 is unable to be moved.

When the trigger 180 is released, the ratchet plate 70 is biased by the spring 75 backward into the initial state (shown in FIG. 7.) Accompanied with the movement of the ratchet plate 70, the bar 182 of the trigger 180 is pushed by the activating portion 72 of the ratchet plate 70 into the initial state. During the movement, the piston rod 40 is kept at the retracted position due to the resistance of the fluid in the cylinder 10. By repeating the squeezing of the trigger 180, the piston rod 40 is retracted thereby to suck up the fluid into the cylinder 10 through the nozzle 20.

What is claimed is:

1. A suction and dispensing tool for sucking and dispensing a fluid such as a high viscosity oil from/to a gear box and the like comprising:
   a cylinder storing the fluid;
   a nozzle attached to a front end of said cylinder;
   a piston moving forward and backward in said cylinder;
   a piston rod for driving said piston, the rod extending in a length direction of said cylinder and projecting through a rear end of said cylinder opposite to said nozzle; and
   two ratchet type driving mechanisms for selectively feeding said piston rod forward or backward,
   wherein said driving mechanism comprises:
   a frame having a handle, the frame mounted to said cylinder and guiding said piston rod in a slidable manner; and
   two triggers rotatably attached to said frame relatively at a front side or a rear side of said handle, and to be rotated toward said handle so as to move said piston rod forward or backward.

2. A suction and dispensing tool according to claim 1, wherein said nozzle is formed with an on-off valve.

3. A suction and dispensing tool according to claim 1, wherein a measuring cup for the fluid is detachably attached to said cylinder or nozzle.

4. A suction and dispensing tool according to claim 1, wherein said ratchet type driving mechanism further comprises:
   two ratchet assemblies attached to said frame at the front and rear sides of said handle,
   each of said ratchet assembly comprising:
   a trigger to be rotated toward and away from said handle;
   a ratchet plate, through which said piston rod is passed, relatively engaging with said piston rod by rotating said trigger; and
   a spring biasing said ratchet plate to said handle, wherein by rotating said trigger to said handle said ratchet plate engages with said piston rod and then moves said ratchet plate forward or backward while keeping the engagement with said piston rod, resulting in the forward and backward movement of said piston rod.

5. A suction and dispensing tool according to claim 2, wherein a measuring cup for the fluid is detachably attached to said cylinder or nozzle.

6. A suction and dispensing tool for sucking and dispensing a fluid such as a high viscosity oil from/to a gear box and the like comprising:
   a cylinder storing the fluid;
   a nozzle attached to a front end of said cylinder;
   a piston moving forward and backward in said cylinder;
   a piston rod for driving said piston, the rod extending in the length direction of said cylinder and projecting through a rear end of said cylinder opposite to said nozzle; and
   two ratchet type driving mechanisms for selectively feeding said piston rod forward or backward,
   wherein said driving mechanism comprises:
   a frame having two handles, the frame mounted to said cylinder and guiding said piston rod in a slidable manner; and a trigger rotatably attached to said frame at the center of said handles, and to be rotated toward each of said handles so as to move said piston rod forward or backward.

7. A suction and dispensing tool according to claim 6, wherein said ratchet type driving mechanism further comprises:

a trigger rotatably arranged at the center of said handles and to be rotated toward and away from each of said handle; and two ratchet assemblies attached to said frame at the front and rear sides of said trigger,
each of said ratchet assembly comprising:
a ratchet plate, through which said piston rod is passed, selectively engaging with said piston rod by rotating said trigger; and a spring biasing said ratchet plate to said trigger, wherein by rotating of said trigger said ratchet plate engages with said piston rod and then moves said ratchet plate forward or backward while keeping the engagement with said piston rod, resulting in the forward and backward movement of said piston rod.

8. A suction and dispensing tool according to claim 6, wherein said nozzle is formed with an on-off valve.

9. A suction and dispensing tool according to claim 6, wherein a measuring cup for the fluid is detachably attached to said cylinder or nozzle.

10. A suction and dispensing tool according to claim 8, wherein a measuring cup for the fluid is detachably attached to said cylinder or nozzle.

* * * * *